(12) United States Patent
Kuwayama

(10) Patent No.: US 10,214,052 B2
(45) Date of Patent: *Feb. 26, 2019

(54) PNEUMATIC RADIAL TIRE FOR PASSENGER VEHICLES

(75) Inventor: Isao Kuwayama, Tokyo (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/695,399

(22) PCT Filed: Mar. 22, 2011

(86) PCT No.: PCT/JP2011/001665
§ 371 (c)(1),
(2), (4) Date: Oct. 30, 2012

(87) PCT Pub. No.: WO2011/135774
PCT Pub. Date: Nov. 3, 2011

(65) Prior Publication Data
US 2013/0042953 A1 Feb. 21, 2013

(30) Foreign Application Priority Data

Apr. 30, 2010 (JP) .................................. 2010-105780

(51) Int. Cl.
*B60C 3/04* (2006.01)
*B60C 9/20* (2006.01)
*B60C 9/28* (2006.01)

(52) U.S. Cl.
CPC .............. *B60C 3/04* (2013.01); *B60C 9/2009* (2013.04); *B60C 9/28* (2013.01);
(Continued)

(58) Field of Classification Search
CPC .......... B60C 3/04; B60C 9/2009; B60C 9/28; B60C 9/18; B60C 9/20; B60C 2009/2048;
(Continued)

(56) References Cited

U.S. PATENT DOCUMENTS 2,600,231 A 6/1952 Ewart
3,628,587 A * 12/1971 O'Neil .................. B60C 9/2006
152/527

(Continued)

FOREIGN PATENT DOCUMENTS

BG 61716 B1 4/1998
EP 0370699 A2 5/1990
(Continued)

OTHER PUBLICATIONS

English language machine translation of JP2000-190706, 2000.*
Kuwayama et al. "Experimental and Numerical Analysis of the Conceptual Next Generation Ecology Tire (First Report)," SAE Int. J. Passeng. Cars—Mech. Syst. 6(2):2013, doi:10.4271/2013-01-0741.*

(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

A run-flat tire of the present invention is a pneumatic radial tire for passenger vehicles which has a carcass composed of plies of radially arranged cords toroidally extending between a pair of bead portions, and the a W/L ratio of the section width W to the outer diameter L of the tire is 0.25 or less.

8 Claims, 5 Drawing Sheets

(a)

(b)

(52) U.S. Cl.
CPC ..... *B60C 2009/2048* (2013.04); *Y02T 10/862* (2013.01); *Y10T 152/10855* (2015.01)

(58) Field of Classification Search
CPC .... B60C 2009/1828; B60C 2009/2022; B60C 2009/2038; B60C 2009/2041; B60C 2009/2051; B60C 2009/2074; B60C 2009/208; B60C 2009/209; B60C 2009/2093; Y10T 152/10855
USPC ........................................................ 152/454
See application file for complete search history.

(56) References Cited

U.S. PATENT DOCUMENTS

| | | | | |
|---|---|---|---|---|
| 3,739,829 A | * | 6/1973 | Powell et al. | ................. 152/521 |
| 3,786,851 A | | 1/1974 | Mirtain et al. | |
| 4,385,653 A | * | 5/1983 | Okazaki | ................. B60C 11/00 |
| | | | | 152/209.5 |
| 4,800,941 A | * | 1/1989 | Kabe et al. | ................. 152/531 |
| 6,481,479 B1 | | 11/2002 | Weed et al. | |
| 2008/0093003 A1 | * | 4/2008 | Sandstrom et al. | .......... 152/532 |

FOREIGN PATENT DOCUMENTS

| | | | | | |
|---|---|---|---|---|---|
| FR | 2719525 | A1 | | 11/1995 | |
| JP | 53040903 | A | | 4/1978 | |
| JP | S63-106102 | A | | 5/1988 | |
| JP | 3-213404 | A | | 9/1991 | |
| JP | 05-131810 | A | | 5/1993 | |
| JP | 05131810 | A | * | 5/1993 | ............... B60C 9/18 |
| JP | H05-162506 | A | | 6/1993 | |
| JP | 7-40706 | A | | 2/1995 | |
| JP | H07-323703 | A | | 12/1995 | |
| JP | 2000-190706 | A | | 7/2000 | |
| JP | 2000190706 | A | * | 7/2000 | ............... B60C 9/00 |
| JP | 2004-284552 | A | | 10/2004 | |
| JP | 2008-260348 | A | | 10/2008 | |
| JP | 2010-47191 | A | | 3/2010 | |

OTHER PUBLICATIONS

600R16 Coker Classic Blackwall Tire as accessed on the Internet Archive at http://web.archive.org/web/20081004230735/http://store.coker.com/600r16-coker-classic-blackwall-tire.html showing the page as of Oct. 4, 2008.*
Coker Classic Radial 600R16—Blackwall Tire as accessed at http://www.tiresandwires.com/Coker-Classic-Radial-600R16--Blackwall-Tire_p_69.html on Jan. 11, 2015.*
Machine translation of JP03-213404 (no date).*
05-07 Cadillac STS Factory Goodyear T145/70R17 Spare Wheel Tire OEM V8 as accessed from http://www.ebay.com/itm/05-07-Cadillac-Sts-Factory-Goodyear-T145-70R17-Spare-Wheel-Tire-Oem-V8-/172734714482 on Aug. 14, 2017.*
International Search Report issued in PCT/JP2011/001665 dated Jun. 28, 2011.
Extended European Search Report, dated Mar. 13, 2014, issued in European Patent Application No. 11774565.3.
Chinese Office Action, dated Aug. 15, 2014, issued in corresponding Chinese Patent Application No. 201180032050.2.
Japanese Office Action dated Feb. 10, 2015, issued in corresponding Japanese Patent Application No. 2012-512634.
Chinese Office Action dated Feb. 17, 2015, issued in corresponding Chinese Patent Application No. 201180032050.2.
Communication dated May 26, 2015 from the Japanese Patent Office issued in corresponding Japanese application No. 2012512634.
Japanese Office Action dated Nov. 11, 2014, issued in corresponding Japanese Patent Application No. 2012-512634.
Communication dated Sep. 8, 2015, issued by the Japan Patent Office in corresponding Japanese Application No. 2012-512634.
Communication dated Nov. 2, 2015, issued by the European Patent Office in corresponding European Application No. 11 774 565.3.
ETRTO Standards Manual 2007, The European Tyre and Rim Technical Organisation, pp. 25, 27 and 29.
Non Final Office Action dated Jun. 7, 2017 issue in U.S. Appl. No. 14/355,738.

* cited by examiner (a)     (b)

(a)

(b)

(a)

Tire width direction

Tire circumference direction

25mm

200mm

S (b)

R

F

P  Q

S

A 9   9

(c)

F(N)

Load

Slope a(N/mm)

5mm

Deflection

A(mm)

PNEUMATIC RADIAL TIRE FOR PASSENGER VEHICLES

TECHNICAL FIELD

The present invention relates to a pneumatic radial tire for passenger vehicles, and in particular to a pneumatic radial tire for passenger vehicles which can ensure both high fuel efficiency and ride comfort of a vehicle with the tire mounted.

RELATED ART

Vehicles built around 1960 and earlier were lightweight and the speed required of the vehicles was lower, so that the load on tires was lower. Therefore, bias tires having a smaller tire section width had been used. At present, however, as vehicles become heavier and faster, their tires have been made to have a radial structure and to have a larger width (Patent Document 1 and the like).

A tire using a radial carcass has a more rigid tire crown portion as compared with a bias tire, and has excellent wear resistance. Further, the rigidity of the crown portion is very high and the propagation of motion between tire components is suppressed, so that the rolling resistance is reduced. Thus, such a tire is characterized by high fuel efficiency and high cornering power.

Further, the tire footprint area can be increased by increasing the tire section width to increase cornering power.

However, tires with larger section widths compress space in vehicles and deteriorate the ride comfort. Further, increase in the air resistance deteriorates fuel efficiency, which is a problem.

In recent years, increasing interest in environmental problems is accompanied by demand for higher fuel efficiency. In particular, electronic vehicles having been put practice for the future require space secured around tires for accommodating drive components such as a motor for controlling the torque for rotating the tires; therefore, it has become increasingly important to secure space around tires.

PRIOR ART DOCUMENT

Patent Document

Patent Document 1: Japanese Patent Application Publication No. JPH7-40706

DISCLOSURE OF THE INVENTION

Problems to be Solved by the Invention

It is therefore an object of the present invention to solve the above problems and to provide a pneumatic radial tire for passenger vehicles which achieves both low (air) drag coefficient (Cd value) of a vehicle with the tire mounted and low tire rolling resistance (RR value), high fuel efficiency, and sufficient space in the vehicle.

Means for Solving the Problem

The inventor made intensive studies to solve the above problems.

Consequently, the inventor found that, with respect to a radial tire, limiting the section width W and the outer diameter L of the tire to obtain an appropriate ratio is significantly effective for achieving the expected improved characteristics. Thus, the present invention was completed.

The present invention primarily includes the following components for solving the foregoing problems.

(1) A pneumatic radial tire for passenger vehicles comprising a carcass composed of plies of radially arranged cords toroidally extending between a pair of bead portions, wherein a W/L ratio of a section width W to an outer diameter L of the tire is 0.25 or less.

(2) The pneumatic radial tire for passenger vehicles according to (1) above, wherein the W/L ratio is 0.24 or less.

(3) The pneumatic radial tire for passenger vehicles according to any one of (1) to (2) above, further comprising a reinforcement member composed of cords extending in a tire width direction at a crown portion of the carcass on the outer side in a tire radial direction.

(4) The pneumatic radial tire for passenger vehicles according to (3) above,
wherein a belt composed of a plurality of belt layers and a tread are sequentially disposed on the reinforcement member on the outer side in the tire radial direction, and
the reinforcement member has a length in a tire width direction corresponding to 50% to 100% of a length of a belt layer having a maximum length in the tire width direction among the belt layers.

(5) The pneumatic radial tire for passenger vehicles according to (3) above,
wherein a belt composed of a plurality of belt layers and a tread are sequentially disposed on the reinforcement member on the outer side in the tire radial direction,
a plurality of main grooves extending along a tire equator are provided in the tread, and
the reinforcement member is disposed at a position corresponding to an outermost main groove in the tire width direction.

(6) The pneumatic radial tire for passenger vehicles according to (5) above, wherein a length of the reinforcement member in the tire width direction is 20 mm or more longer than a groove width of the outermost main groove in the tire width direction.

(7) The pneumatic radial tire for passenger vehicles according to any one of (3) to (6) above, wherein the reinforcement member has an out-of-plane bending stiffness of 6 N/mm or more, and has a tensile strength specified in JIS Z 2241 of 1255 kPa or more.

Effect of the Invention

The present invention can provide a pneumatic radial tire for passenger vehicles with reduced drag coefficient (Cd value) of a vehicle and reduced tire rolling resistance (RR value), which is excellent in fuel efficiency and ride comfort of a vehicle.

BRIEF DESCRIPTION OF THE DRAWINGS

FIG. 2($b$) is a diagram showing a vehicle with conventional tires.

BEST MODE FOR CARRYING OUT THE INVENTION

The following is an explanation of how a pneumatic radial tire for passenger vehicles in accordance with the present invention was invented.

Figure 1:
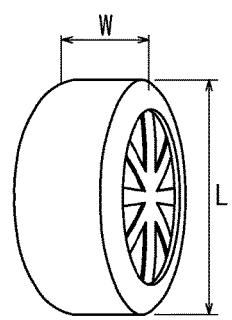
FIG. 1 is a diagram showing the section width W and the outer diameter L of a tire.
Figure 2:
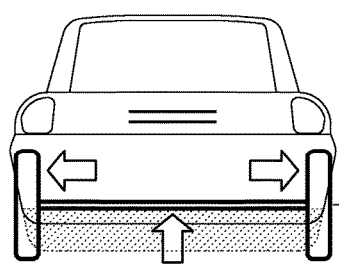
FIG. 2($a$) is a diagram showing a vehicle with tires having an increased diameter and a reduced width in accordance with the present invention.
Figure 2:
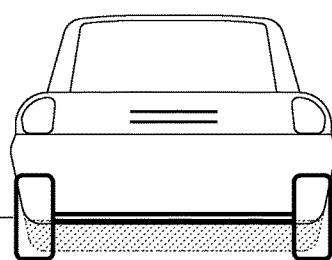

First, the inventor focused on that a tire section width W of a radial tire (see FIG. 1) smaller than conventional allows vehicle space to be secured, and in particular, space for installing drive components to be secured between opposite tires in the vicinity of portions where tires are mounted (see FIG. 2).

Further, when the section width W of a tire is reduced, the area of the tire viewed from the front (hereinafter referred to as frontal projected area) decreases, which results in the benefit of reducing the drag coefficient (Cd value) of the vehicle.

However, greater deformation at the grounded area relatively increases the tire rolling resistance (RR value) in terms of the same air pressure, which is a problem.

On the other hand, the inventor found that the above problem can be solved using properties specific to radial tires. Specifically, the inventor focused on that since the tread of a radial tire is less deformed as compared with a bias tire, an outer diameter L of a radial tire (see FIG. 1) larger than conventional reduces the effects of road surface roughness, and allows the rolling resistance (RR value) to be reduced in terms of the same air pressure. Further, the present inventor found that larger tire diameters make it possible to improve the load capacity of tires and that since increase in the diameter of a radial tire raises a wheel shaft to a higher position and increases the space under the floor as shown in FIG. 2, space for a trunk of a vehicle and the like, and space for installing drive components can be secured.

Here, as described above, both smaller width and larger diameter of a tire are advantageous in securing vehicle space but are traded off against the rolling resistance (RR value). In addition, the drag coefficient (Cd value) of a vehicle can be reduced by reducing the tire width.

Therefore, the inventor made intensive studies to improve the drag coefficient (Cd value) and the rolling resistance (RR value) by optimizing the balance between the tire section width and the tire outer diameter as compared with conventional radial tires.

The inventor focused on the W/L ratio of the tire section width W with respect to the tire outer diameter L. The inventor performed a test for calculating the drag coefficient (Cd value) and the rolling resistance (RR value) of tires having different sizes, including irregular sized tires that are mounted on vehicles, thereby finding a W/L ratio which enhances both of the properties as compared with conventional radial tires.

The experiment results which helped to find a favorable range of W/L ratio will be described in detail below.

Figure 3:
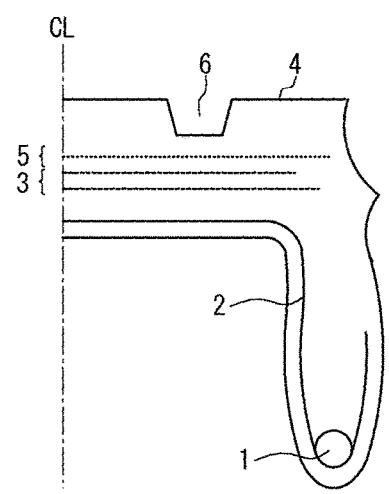
FIG. 3 is a schematic cross-sectional view of a radial tire according to one embodiment of the present invention.

FIG. 3 is a schematic cross-sectional view of a radial tire according to one embodiment of the present invention in a tire width direction. Note that FIG. 3 shows only a half part defined by the tire equator CL.

A plurality of pneumatic radial tires for passenger vehicles with varied tire sizes were experimentally produced in accordance with the custom as sample tires as shown in FIG. 3. Each of the tires includes a carcass 2 toroidally extending between a pair (only a half on one side in FIG. 3) of bead cores 1 and radially arranged.

Various tire sizes including irregular tire sizes that deviate from conventional standards such as JATMA (Japanese standards for tires), TRA (U.S. tire standards), and ETRTO (European tire standards) were tried without adhering to the standards.

Here, in the illustrated tire, the carcass 2 is composed of organic fibers, and a belt 3 including a plurality of belt layers, 2 belt layers in the illustration and a tread 4 are sequentially disposed on the crown portion of the carcass 2 on the outer side in a tire radial direction. The illustrated 2 belt layers are inclined belt layers inclined at an angle of 20° to 40° with respect to the tire equatorial plane CL, in which cords in one layer cross cords in the other layer. A belt protection layer 5 composed of organic fibers extending along the tire equatorial plane CL is disposed on the belt layers on the outer side in the tire radial direction. The tread 4 is provided with a plurality of main grooves 6 (one in the half part is shown in the illustration) extending in a tire circumferential direction.

A number of tires with varied section widths and outer diameters were experimentally produced based on the above tire structure.

Further, a tire having a structure in accordance with the custom with a tire size of 195/65R15 was prepared as a conventional tire, providing the criteria for the tests. Tires with this tire size are used in vehicles for most general-purpose, and are most suitable for comparing the performance of tires.

Here, specifications of each tire are shown in Table 1.

TABLE 1

|  | Tire size | W/L ratio |
| --- | --- | --- |
| Sample tire 1 | 155/55R21 | 0.22 |
| Sample tire 2 | 165/55R21 | 0.23 |
| Sample tire 3 | 155/55R19 | 0.24 |
| Sample tire 4 | 155/70R17 | 0.24 |
| Sample tire 5 | 165/55R20 | 0.24 |
| Sample tire 6 | 165/65R19 | 0.24 |
| Sample tire 7 | 165/70R18 | 0.24 |
| Sample tire 8 | 165/55R16 | 0.28 |
| Sample tire 9 | 175/65R15 | 0.28 |
| Sample tire 10 | 185/60R17 | 0.28 |
| Sample tire 11 | 195/65R17 | 0.28 |
| Sample tire 12 | 205/60R18 | 0.28 |
| Sample tire 13 | 185/50R16 | 0.31 |
| Sample tire 14 | 205/60R16 | 0.31 |
| Sample tire 15 | 215/60R17 | 0.31 |
| Sample tire 16 | 225/65R17 | 0.31 |
| Sample tire 17 | 175/55R21 | 0.24 |
| Sample tire 18 | 205/50R21 | 0.28 |
| Sample tire 19 | 215/50R22 | 0.28 |
| Sample tire 20 | 215/60R17 | 0.31 |
| Sample tire 21 | 225/55R19 | 0.31 |
| Sample tire 22 | 235/50R21 | 0.31 |
| Sample tire 23 | 165/55R19 | 0.25 |
| Sample tire 24 | 165/70R17 | 0.25 |
| Sample tire 25 | 175/55R20 | 0.25 |
| Sample tire 26 | 175/65R19 | 0.25 |
| Sample tire 27 | 175/80R18 | 0.25 |
| Sample tire 28 | 185/55R21 | 0.25 |
| Sample tire 29 | 155/50R21 | 0.23 |
| Sample tire 30 | 145/50R19 | 0.23 |
| Sample tire 31 | 145/55R19 | 0.23 |
| Sample tire 32 | 145/60R18 | 0.23 |
| Conventional tire | 195/65R15 | 0.31 |

Each test was performed as described below.

<Drag Coefficient (Cd Value)>

In a laboratory, each of the tires were mounted on a vehicle with a displacement of 1500 cc, and the aerodynamic force was measured using a floor balance placed under wheels when air was blown at a speed corresponding to 100 km/h to evaluate the drag coefficient using indices based on the drag coefficient of Conventional tire being 100. The smaller the index value is, the lower the air resistance is.

<Rolling Resistance (RR Value)>

The rolling resistance of each of the above tires being mounted on a rim was measured under the conditions of: air pressure: 220 kPa, load applied: 3.5 kN, and drum rotation speed: 100 km/h.

The evaluation results are shown with indices based on the RR value of Conventional tire being 100. Smaller index values imply lower rolling resistance.

Figure 4:
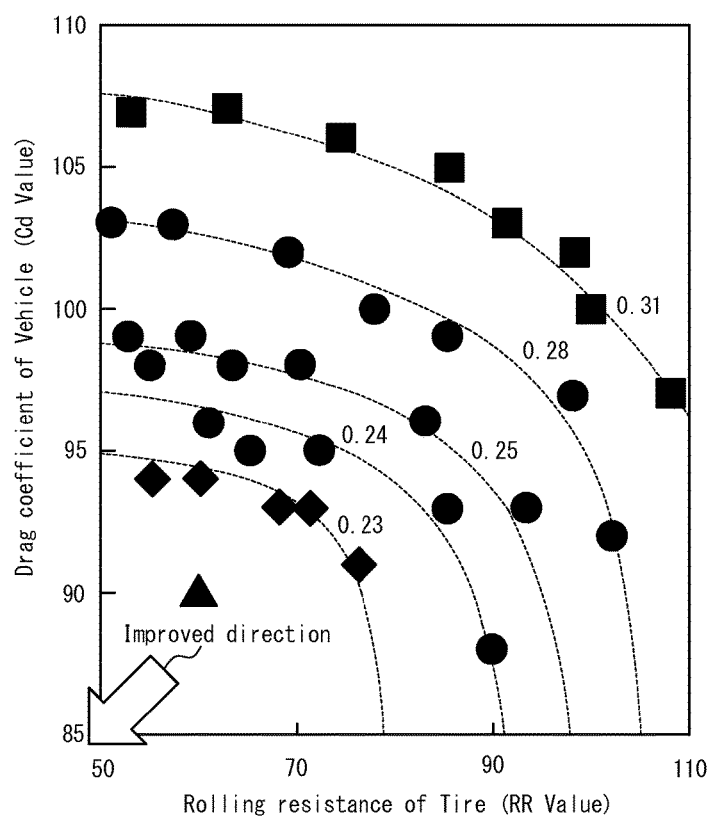
FIG. 4 is a plot showing the relationships between the W/L ratio (of the section width W to the outer diameter L) of a tire, the drag coefficient (Cd value), and the tire rolling resistance (RR value) of a vehicle.

The test results are shown in Table 2 and FIG. 4.

TABLE 2

|  | RR value | Cd value |
|---|---|---|
| Sample tire 1 | 60 | 90 |
| Sample tire 2 | 55 | 94 |
| Sample tire 3 | 90 | 88 |
| Sample tire 4 | 85 | 93 |
| Sample tire 5 | 72 | 95 |
| Sample tire 6 | 65 | 95 |
| Sample tire 7 | 61 | 96 |
| Sample tire 8 | 102 | 92 |
| Sample tire 9 | 98 | 97 |
| Sample tire 10 | 85 | 99 |
| Sample tire 11 | 78 | 100 |
| Sample tire 12 | 69 | 102 |
| Sample tire 13 | 108 | 97 |
| Sample tire 14 | 98 | 102 |
| Sample tire 15 | 91 | 103 |
| Sample tire 16 | 85 | 105 |
| Sample tire 17 | 55 | 98 |
| Sample tire 18 | 57 | 103 |
| Sample tire 19 | 51 | 103 |
| Sample tire 20 | 74 | 106 |
| Sample tire 21 | 63 | 107 |
| Sample tire 22 | 53 | 107 |
| Sample tire 23 | 93 | 93 |
| Sample tire 24 | 83 | 96 |
| Sample tire 25 | 70 | 98 |
| Sample tire 26 | 63 | 98 |
| Sample tire 27 | 59 | 99 |
| Sample tire 28 | 53 | 99 |
| Sample tire 29 | 60 | 94 |
| Sample tire 30 | 68 | 93 |
| Sample tire 31 | 71 | 93 |
| Sample tire 32 | 76 | 91 |
| Conventional tire | 100 | 100 |

From the test results shown in Table 2 and FIG. 4, both the drag coefficient (Cd value) and the rolling resistance (RR value) of radial tires having a tire size satisfying a W/L ratio of the tire section width W to the tire outer diameter L of 0.25 or less were found to be reduced more than a tire with a tire size of 195/65R15, which is Conventional tire. The Cd value and the RR value of radial tires having a tire size satisfying a W/L ratio of 0.24 or less were further reduced. The Cd value and the RR value of radial tires having a tire size satisfying a W/L ratio of 0.23 or less were still further reduced to less than 95 and less than 80, respectively.

Next, the following test was performed on the above sample tires in order to confirm that the fuel efficiency and the ride comfort of a vehicle are actually improved when the W/L ratio of the tire section width W to the tire outer diameter L is 0.25 or less.

<Actual Fuel Consumption>

A test was performed with respect to JC08 mode driving. The evaluation results are shown with indices based on the evaluation result of a tire of a conventional example being 100, and larger index values represent better fuel efficiency.

<Ride Comfort>

The width of a rear trunk of a vehicle having a width of 1.7 m with the tires mounted was measured. The evaluation results are shown with indices based on the evaluation result of a tire of a conventional example being 100, and larger index values represent better ride comfort.

The test results are shown in Table 3 below.

TABLE 3

|  | Actual fuel consumption | Ride comfort |
|---|---|---|
| Sample tire 1 | 117 | 105 |
| Sample tire 2 | 119 | 104 |
| Sample tire 3 | 105 | 105 |
| Sample tire 4 | 107 | 105 |
| Sample tire 5 | 112 | 104 |
| Sample tire 6 | 114 | 104 |
| Sample tire 7 | 116 | 104 |
| Sample tire 8 | 100 | 104 |
| Sample tire 9 | 101 | 102 |
| Sample tire 10 | 106 | 101 |
| Sample tire 11 | 109 | 100 |
| Sample tire 12 | 112 | 99 |
| Sample tire 13 | 97 | 101 |
| Sample tire 14 | 101 | 99 |
| Sample tire 15 | 103 | 98 |
| Sample tire 16 | 106 | 97 |
| Sample tire 17 | 118 | 102 |
| Sample tire 18 | 117 | 98 |
| Sample tire 19 | 119 | 97 |
| Sample tire 20 | 110 | 96 |
| Sample tire 21 | 114 | 95 |
| Sample tire 22 | 118 | 95 |
| Sample tire 23 | 103 | 103 |
| Sample tire 24 | 107 | 102 |
| Sample tire 25 | 112 | 103 |
| Sample tire 26 | 115 | 102 |
| Sample tire 27 | 116 | 101 |
| Sample tire 28 | 119 | 101 |
| Sample tire 29 | 116 | 105 |
| Sample tire 30 | 113 | 106 |
| Sample tire 31 | 112 | 105 |
| Sample tire 32 | 110 | 107 |
| Conventional tire | 100 | 100 |

As shown in Table 1 and Table 3, at least one of the fuel efficiency and the ride comfort of some of the sample tires with a W/L ratio of 0.28 or 0.31 were lower than those of Conventional tire. Meanwhile, both the fuel efficiency and ride comfort of Sample tires 1-7, 17, and 23-32 with a W/L ratio of 0.25 or less were found to be better than those of Conventional tire. Further, it is shown that the fuel efficiency and ride comfort of tires with a W/L ratio of 0.24 or less are improved more than those of tires with a W/L ratio of 0.25. In particular, tires with a W/L ratio of 0.23 or less are significantly advantageous in improving the fuel efficiency and ride comfort.

The inventor thus found that when the W/L ratio of a pneumatic radial tire for passenger vehicles is 0.25 or less, the ride comfort of a vehicle can be improved, and both the drag coefficient and the tire rolling resistance of the vehicle can be reduced, which allows the fuel efficiency to be improved.

It should be noted that when the section width W of a tire is small, the input (pressure) from the road surface gets strong as described above, which would lead to buckling phenomenon in the belt in particular in the vicinity of circumferential grooves of the tire. When buckling phenomenon occurs, the shape of the ground contact area is changed to increase energy loss, which results in increased rolling resistance, and reduced wear resistance and cornering power.

In view of the above, tire structures for preventing increase in the rolling resistance, and reduction in the wear resistance and the cornering power with respect to a radial tire of the present invention will now be described.

A pneumatic radial tire for passenger vehicles according to the present invention preferably includes a reinforcement member extending in a tire width direction at the crown portion of a carcass on the outer side in the tire radial direction.

A description will hereinafter be made according to embodiments shown in FIGS. 5(a) and 5(b).

FIG. 5(a) is a schematic cross-sectional view of a radial tire according to one embodiment of the present invention. Note that FIG. 5(a) shows only a half part defined by the tire equator CL. Further, the tire shown in FIG. 5(a) has a W/L ratio of the tire section width W to the tire outer diameter L of 0.25 or less.

The tire shown in FIG. 5(a) is different from the tire shown in FIG. 3 in that the tire shown in FIG. 5(a) has, between the carcass 2 and the belt 3, a reinforcement member 7 which is composed of cords extending in a tire width direction and has a length in the tire width direction corresponding to 50% to 100% of that of a belt layer having the maximum length in the tire width direction among a plurality of belt layers.

This reinforcement member 7 enhances the out-of-plane bending stiffness of the belt, which allow buckling phenomenon to be suppressed, tread deformation to be suppressed accordingly, and the tire rolling resistance to be further reduced. Thus, the fuel efficiency can be further improved.

Moreover, suppression of buckling phenomenon can result in improved wear resistance and improved cornering power.

In addition, for example, plies of rubber-coated steel cords can be used as the reinforcement member 7.

The length in the tire width direction of the reinforcement member 7 was set within the above range because a length corresponding to less than 50% of the length in the tire width direction of the belt layer having the maximum width cannot sufficiently reinforce the tread on the outer side in the width direction, where buckling easily occurs. On the other hand, when the length corresponds to more than 100% of that length, the durability of the belt ends decreases.

Another preferable tire structure may be a tire structure shown in FIG. 5(b).

The tire structure in FIG. 5(b) is different from the tire structure in FIG. 5(a) in that a reinforcement member 7a extending in the tire width direction between the carcass 2 and the belt 3 is locally provided at a position corresponding to a main groove 6 on the outer side in the tire width direction.

The "position corresponding to (corresponding position)" here indicates that the reinforcement member is disposed on the outermost main groove in the tire width direction, on the inner side in a tire diameter direction when no load is applied on the tire. Further, the position indicates that in a tire width direction, the inner end of the reinforcement member in the tire width direction coincides with or is inner than the inner end of the outermost main groove in the tire width direction, and also that in the tire width direction, the outer end of the reinforcement member in the tire width direction coincides with or is outer than the outer end of the outermost main groove in the tire width direction.

This reinforcement member 7a is provided at a position corresponding to the outermost main groove in the tire width direction, where buckling phenomenon easily occurs. Therefore, the out-of-plane bending stiffness of the area where the belt easily deforms can be improved, thereby suppressing buckling phenomenon, accordingly suppressing tread deformation, and further reducing the tire rolling resistance. Thus, the fuel efficiency can be further improved.

Moreover, suppression of buckling phenomenon can result in improved wear resistance and improved cornering power.

A reinforcement member provided only at a position corresponding to the outermost main groove in the tire width direction can alleviate the increase in the weight of the tire due to the interposition of the reinforcement member as compared with the case shown in FIG. 5(a).

Note that when a reinforcement member is provided on a portion corresponding to the outermost main groove in the tire width direction, the length of the member in the tire width direction may be less than 50% of the length in the tire width direction of the belt layer having the maximum width.

The reinforcement member 7a may use, for example, plies made of steel cords.

Further, the length of the reinforcement member 7a in the tire width direction is preferably 20 mm or more longer than the groove width of the outermost main groove in the tire width direction and not longer than 40 mm.

With a groove width of less than 20 mm, the reinforcement member 7a is not effective enough to improve the out-of-plane bending stiffness of the belt; meanwhile, with a groove width of more than 40 mm, the effect of suppressing the increase in the tire weight is insufficient.

In FIGS. 5(a) and 5(b), the reinforcement member is disposed in anticipation of improving the out-of-plane bending stiffness at the belt surface of the belt; therefore, the reinforcement member is preferably a member with high out-of-plane bending stiffness.

"Out-of-plane bending stiffness" herein is defined as below.

Figure 6:
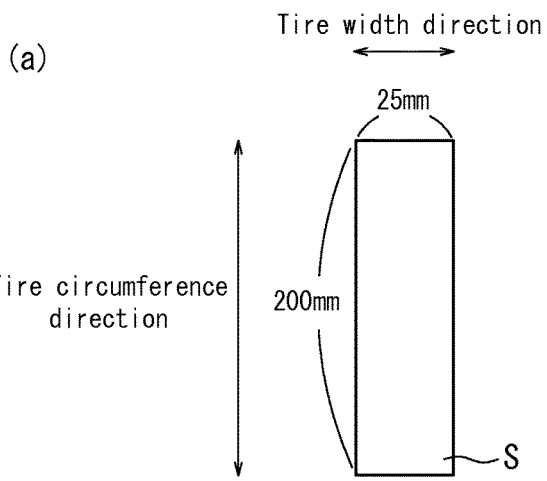
FIGS. 6(a) to 6(c) are diagrams for illustrating out-of-plane bending stiffness.

As shown in FIG. 6(a), Sample S is made to have reinforcement member cut into a rectangle sized 200 mm in a tire circumferential direction and 25 mm in a tire width direction.

Next, as shown in FIG. 6(b), the cut reinforcement member is supported by a supporting member 9. In this situation, the center of Sample S is pushed from a direction perpendicular to the surface of the rectangle using a push plate (not shown).

In Sample S in the state, the distance between points P and Q supported by the supporting member 9 is 160 (mm), the pressing force is F (N), and the amount of deflection of the sample is A (mm).

Here, as shown in FIG. 6(c), the out-of-plane bending stiffness (N/mm) in an experimentally obtained load-deflection curve (F-A curve) is defined as a slope a (N/mm) of the tangent line at a point where the amount of deflection is 5 (mm).

The out-of-plane bending stiffness of the above reinforcement member is preferably 6 N/mm or more.

Further, in FIGS. 5(a) and 5(b), the reinforcement member is required to be strong enough to resist the internal pressure of the tire, bump input, and the like, so that it is preferably a member having a high tensile strength specified in JIS Z 2241.

Specifically, the tensile strength specified in JIS Z 2241 is preferably 1255 kPa or more.

Note that a pneumatic radial tire for passenger vehicles according to the present invention preferably has an air volume of 15000 cm³ or more. This level of air volume is required to retain the minimum load capacity of the tire.

EXAMPLES

In the present invention, in order to examine the performance of pneumatic radial tires for passenger vehicles, which have improved tire structures, a plurality of tires of the invention (invention tires) were produced experimentally, and tests for evaluating the above described actual fuel consumption and the ride comfort were performed. The test method and the evaluation method are the same as described above.

Further, the following tests for evaluating the cornering power, wear resistance, and tire mass were carried out.

Figure 5:
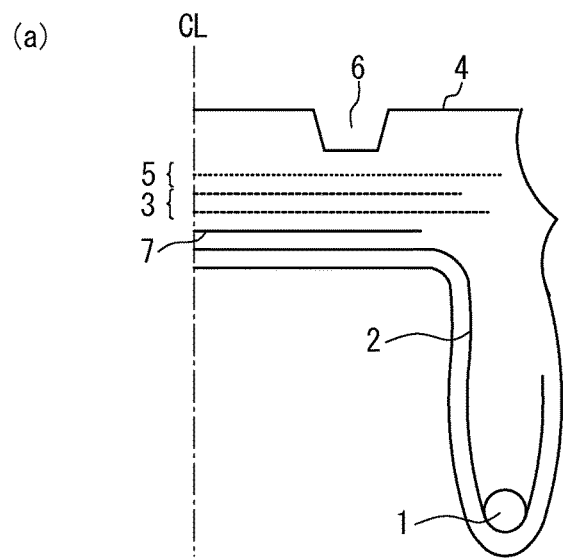
FIGS. 5($a$) and 5($b$) are schematic cross-sectional views each showing a radial tire according to an embodiment of the present invention.
Figure 5:
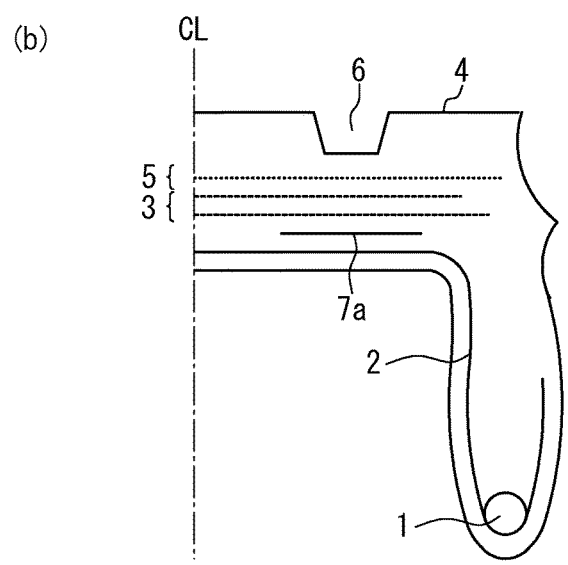

The plurality of pneumatic radial tires for passenger vehicles having the structures shown in FIGS. 5 (a) and 5(b) were produced experimentally as invention tires. Specifications of each tire are shown in Tables 4 and 5 below.

Note that Sample tires 3, 4, 23, 26, 31, and 32 in Table 4 are identical to Sample tire 3, 4, 23, 26, 31, and 32 in Tables 1 to 3, respectively. Further, Conventional tire in Table 4 is identical to Conventional tire in Tables 1 to 3.

TABLE 4

|  | Tire size | W/L ratio | Tire structure |
|---|---|---|---|
| Sample tire 4 | 155/70R17 | 0.24 | FIG. 3 |
| Invention tire 1 | 155/70R17 | 0.24 | FIG. 5(a) |
| Invention tire 2 | 155/70R17 | 0.24 | FIG. 5(b) |
| Sample tire 3 | 155/55R19 | 0.24 | FIG. 3 |
| Invention tire 3 | 155/55R19 | 0.24 | FIG. 5(a) |
| Invention tire 4 | 155/55R19 | 0.24 | FIG. 5(b) |
| Sample tire 23 | 165/55R19 | 0.25 | FIG. 3 |
| Invention tire 5 | 165/55R19 | 0.25 | FIG. 5(a) |
| Invention tire 6 | 165/55R19 | 0.25 | FIG. 5(b) |
| Sample tire 26 | 175/65R19 | 0.25 | FIG. 3 |
| Invention tire 7 | 175/65R19 | 0.25 | FIG. 5(a) |
| Invention tire 8 | 175/65R19 | 0.25 | FIG. 5(b) |
| Sample tire 31 | 145/55R19 | 0.23 | FIG. 3 |
| Invention tire 9 | 145/55R19 | 0.23 | FIG. 5(a) |
| Invention tire 10 | 145/55R19 | 0.23 | FIG. 5(b) |
| Sample tire 32 | 145/60R18 | 0.23 | FIG. 3 |
| Invention tire 11 | 145/60R18 | 0.23 | FIG. 5(a) |
| Invention tire 12 | 145/60R18 | 0.23 | FIG. 5(b) |
| Conventional tire | 195/65R15 | 0.31 | FIG. 3 |

The cornering power, wear resistance, and tire mass were examined and evaluated as follows.

<Cornering Power>

The cornering power was measured using a flat-belt cornering testing machine (internal pressure: 220 kPa, load: 3.5 kN, and speed: 100 km/h).

The cornering power was evaluated with the index of the cornering power of Sample tire 4 being 100. The larger the index value is, the higher the cornering power is, which is preferable.

<Wear Resistance>

Each of the tires was prepared to have an internal pressure of 220 kPa. Then, the tires were driven under a load of 3.5 kN at a speed of 80 km/h for 30000 km in drum tests.

The wear resistance was evaluated by evaluating the groove left after the above drum drive (remaining groove depth), and was represented by indices based on the wear resistance of Sample tire 4 being 100.

<Tire Mass>

The tire mass was represented by an index based on the mass of Sample tire 4 being 100 (lighter as the value is smaller).

The test results are shown in Tables 5 and 6 below.

TABLE 5

|  | Ride comfort | Rolling resistance | Actual fuel consumption |
|---|---|---|---|
| Sample tire 4 | 105 | 85 | 103 |
| Invention tire 1 | 105 | 77 | 110 |
| Invention tire 2 | 105 | 81 | 108 |
| Sample tire 3 | 105 | 90 | 105 |
| Invention tire 3 | 105 | 75 | 111 |
| Invention tire 4 | 105 | 83 | 107 |
| Sample tire 23 | 103 | 93 | 103 |
| Invention tire 5 | 103 | 78 | 108 |
| Invention tire 6 | 103 | 82 | 106 |
| Sample tire 26 | 102 | 63 | 115 |
| Invention tire 7 | 102 | 59 | 118 |
| Invention tire 8 | 102 | 61 | 117 |
| Sample tire 31 | 105 | 71 | 112 |
| Invention tire 9 | 105 | 66 | 115 |
| Invention tire 10 | 105 | 68 | 114 |
| Sample tire 32 | 107 | 76 | 110 |
| Invention tire 11 | 107 | 69 | 114 |
| Invention tire 12 | 107 | 71 | 113 |
| Conventional tire | 100 | 100 | 100 |

TABLE 6

|  | Cornering power | Wear resistance | Tire mass |
|---|---|---|---|
| Sample tire 4 | 100 | 100 | 100 |
| Invention tire 1 | 107 | 115 | 108 |
| Invention tire 2 | 103 | 114 | 107 |
| Sample tire 3 | 104 | 107 | 89 |
| Invention tire 3 | 119 | 122 | 98 |
| Invention tire 4 | 112 | 120 | 93 |
| Sample tire 23 | 107 | 112 | 94 |
| Invention tire 5 | 111 | 120 | 104 |
| Invention tire 6 | 109 | 117 | 101 |
| Sample tire 26 | 112 | 116 | 109 |
| Invention tire 7 | 119 | 124 | 117 |
| Invention tire 8 | 116 | 121 | 114 |
| Sample tire 31 | 101 | 102 | 85 |
| Invention tire 9 | 106 | 110 | 90 |
| Invention tire 10 | 104 | 108 | 88 |
| Sample tire 32 | 98 | 101 | 88 |
| Invention tire 11 | 104 | 110 | 93 |
| Invention tire 12 | 101 | 107 | 90 |

As shown in Table 5, both Invention tires 1 and 2 having a W/L ratio of 0.25 or less and having an improved tire structure have further reduced rolling resistance and improved fuel efficiency as compared with Sample tire 4 having the same tire size. Further, they also have comparable ride comfort in a vehicle to Sample tire 4. Similarly, Invention tires 3 to 12 each have reduced rolling resistance and improved fuel efficiency as compared with comparison sample tires having the same tire size. Further, each of them also has comparable ride comfort in a vehicle to the comparison sample tires.

As shown in Table 6, both Invention tires 1 and 2 having a W/L ratio of 0.25 or less and having an improved tire structure are more excellent in the cornering power and wear resistance than Sample tire 4 having the same tire size. Similarly, Invention tires 3 to 12 are more excellent in the cornering power and wear resistance than comparison sample tires having the same tire size.

Moreover, as shown in Table 6, Invention tires 2, 4, 6, 8, 10, and 12 having a reinforcement member disposed only at a position corresponding to the outermost main groove in the tire width direction are shown to each have smaller tire mass than comparison Invention tires 1, 3, 5, 7, 9, and 11 having the same tire size.

INDUSTRIAL APPLICABILITY

In accordance with the present invention, a pneumatic radial tire for passenger vehicles excellent in fuel efficiency and ride comfort can be produced to be offered commercially.

REFERENCE NUMERALS

1: Bead core
2: Carcass
3: Belt
4: Tread
5: Belt reinforcement layer
6: Circumferential main groove
7: Reinforcement member
7a: Reinforcement member (at a position corresponding to the outermost main groove)
9: Supporting member
P: Point on a plane
Q: Point on a plane
R: Distance between the 2 points (mm)
A: Pushing depth (mm)
S: Sample
W: Tire section width
L: Tire outer diameter

The invention claimed is:

1. A tire-ring assembly formed by assembling a pair of bead portions of a passenger vehicle pneumatic radial tire with a rim, the tire-rim assembly comprising:
a carcass composed of plies of radially arranged cords toroidally extending between the pair of bead portions; and
a belt,
wherein a W/L ratio of a section width W to an outer diameter L of the tire is 0.25 or less,
an air volume of the tire is 15000 cm$^3$ or more, and W is equal to or larger than 145 mm,
wherein the tire-rim assembly is inflated under pressure and filled only with gas,
wherein the passenger vehicle pneumatic radial tire is a tubeless tire,
wherein an aspect ratio of the passenger vehicle pneumatic radial tire is greater than or equal to 50 and less than 70,
wherein W and D satisfy:
0.30<W/D<0.52, where D represents a rim diameter of the tire,
wherein the rim diameter of the tire is greater than or equal to 457.2 mm and less than or equal to 533.4 mm, and
wherein the outer diameter of the tire is greater than or equal to 642.1 mm and less than or equal to 725.9 mm.

2. The tire-rim assembly according to claim 1, wherein the W/L ratio is 0.24 or less.

3. The tire-rim assembly according to claim 1, further comprising a reinforcement member composed of cords extending in a tire width direction at a crown portion of the carcass on the outer side in a tire radial direction.

4. The tire-rim assembly according to claim 3,
wherein the belt including a plurality of belt layers and a tread are sequentially disposed on the reinforcement member on the outer side in the tire radial direction, and
the reinforcement member has a length in a tire width direction corresponding to 50% to 100% of a length of a belt layer having a maximum length in the tire width direction among the belt layers.

5. The tire-rim assembly according to claim 3,
wherein a belt composed of a plurality of belt layers and a tread are sequentially disposed on the reinforcement member on the outer side in the tire radial direction,
a plurality of main grooves extending along a tire equator are provided in the tread, and
the reinforcement member is disposed at a position corresponding to an outermost main groove in the tire width direction.

6. The tire-rim assembly according to claim 5, wherein a length of the reinforcement member in the tire width direction is 20 mm or more longer than a groove width of the outermost main groove in the tire width direction.

7. The tire-rim assembly according to claim 3, wherein the reinforcement member has an out-of-plane bending stiffness of 6 N/mm or more, and has a tensile strength specified in JIS Z 2241 of 1255 kPa or more.

8. The tire-rim assembly according to claim 1, wherein a size of the tire is one of 165/55R21, 155/55R19, 165/55R20, 165/65R19, 175/55R21, 165/55R19, 175/55R20, 175/65R19, 145/50R19, 145/55R19, and 145/60R18.

* * * * *